US012587851B2

(12) United States Patent
Pendery et al.

(10) Patent No.: US 12,587,851 B2
(45) Date of Patent: Mar. 24, 2026

(54) CENTRALIZED USER ACCESS MANAGEMENT AND PERSONALIZED SERVICE PROVISIONING

(71) Applicant: DISH Network L.L.C., Englewood, CO (US)

(72) Inventors: Clark Hurst Pendery, Englewood, CO (US); Ryan Scribner, Erie, CO (US); Aaron William Schwartz, Denver, CO (US); Joshua D. Wade, Castle Rock, CO (US); Jason Anthony Madruga, Castle Rock, CO (US); Dalton William Hertel, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 34 days.

(21) Appl. No.: 18/484,219

(22) Filed: Oct. 10, 2023

(65) Prior Publication Data

US 2025/0119738 A1     Apr. 10, 2025

(51) Int. Cl.
*H04W 12/08*       (2021.01)
*G06Q 50/12*       (2012.01)
    (Continued)

(52) U.S. Cl.
CPC ..... *H04W 12/069* (2021.01); *H04W 28/0215* (2013.01); *H04W 60/04* (2013.01); *H04W 88/08* (2013.01)

(58) Field of Classification Search
None
See application file for complete search history.

(56) References Cited

U.S. PATENT DOCUMENTS

2015/0245085 A1 * 8/2015 Warrick ........... H04N 21/44224
                                                      725/71
2017/0164196 A1 * 6/2017 Bryksa .................. H04L 63/083
                    (Continued)

FOREIGN PATENT DOCUMENTS

CN          111401159 A  *  7/2020  ........... G06V 40/172
WO      2021/067082 A1    4/2021

OTHER PUBLICATIONS

U.S. Appl. No. 18/445,079, filed Mar. 29, 2023, Inventors Edward W. Neipris, Joshua David Wade, Tyler Nesper.

*Primary Examiner* — Christopher B Robinson
(74) *Attorney, Agent, or Firm* — Kilpatrick Townsend & Stockton LLP

(57) ABSTRACT

Devices, systems, and methods for provisioning services to a hospitality user in a hospitality establishment are provided. An example method includes creating a user profile for the hospitality user. The user profile includes a user ID and user credential, service type data and user preference data pertaining to a service. The method further includes receiving a request for authentication from a wireless device associated with the hospitality user and connected to a wireless network of the hospitality establishment. The request includes a user-provided credential. The method further includes performing a cloud-based authentication process to determine an authentication status of the hospitality user, sending the authentication status of the hospitality user to a hospitality property management system (PMS) of the hospitality establishment, determining a user registration status of the hospitality user, and providing access to the wireless network to the wireless device, based on the user registration status.

20 Claims, 9 Drawing Sheets

(51) Int. Cl.
*H04W 12/069* (2021.01)
*H04W 28/02* (2009.01)
*H04W 60/04* (2009.01)
*H04W 88/08* (2009.01)

(56) References Cited

U.S. PATENT DOCUMENTS

| 2018/0367543 A1* | 12/2018 | Warrick ................. H04L 63/02 |
| 2019/0053329 A1* | 2/2019 | Deros .................... H04W 4/00 |
| 2019/0116493 A1 | 4/2019 | Cyril et al. |
| 2020/0162890 A1* | 5/2020 | Spencer ................. H04L 43/10 |
| 2020/0213935 A1* | 7/2020 | Lin ....................... H04W 84/12 |
| 2020/0252498 A1* | 8/2020 | Iyer ....................... G05B 15/02 |
| 2020/0396604 A1 | 12/2020 | Olshansky et al. |
| 2021/0099876 A1 | 4/2021 | Neipris et al. |
| 2021/0126894 A1* | 4/2021 | Warrick .............. H04L 61/5069 |

* cited by examiner

500A

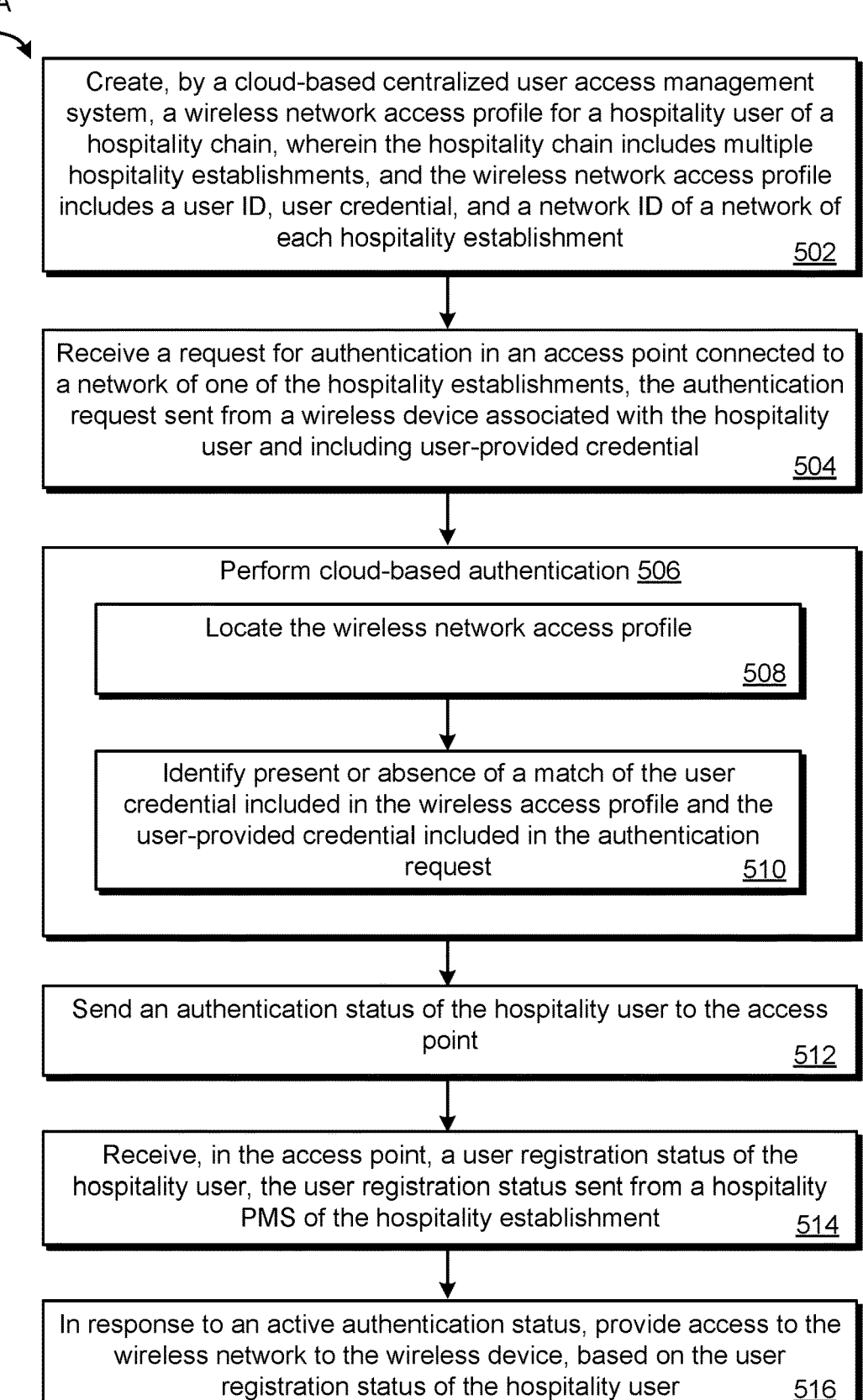

Create, by a cloud-based centralized user access management system, a wireless network access profile for a hospitality user of a hospitality chain, wherein the hospitality chain includes multiple hospitality establishments, and the wireless network access profile includes a user ID, user credential, and a network ID of a network of each hospitality establishment     502

Receive a request for authentication in an access point connected to a network of one of the hospitality establishments, the authentication request sent from a wireless device associated with the hospitality user and including user-provided credential     504

Perform cloud-based authentication 506

Locate the wireless network access profile

508

Identify present or absence of a match of the user credential included in the wireless access profile and the user-provided credential included in the authentication request     510

Send an authentication status of the hospitality user to the access point     512

Receive, in the access point, a user registration status of the hospitality user, the user registration status sent from a hospitality PMS of the hospitality establishment     514

In response to an active authentication status, provide access to the wireless network to the wireless device, based on the user registration status of the hospitality user     516

FIG. 5A

500B

Create, in a cloud-based centralized user access management system, a user profile for a hospitality user of a hospitality chain, wherein the hospitality chain has multiple hospitality establishments, each hospitality establishment has a wireless network, and the user profile includes a user ID and user credential, as well as service type data and user preference data pertaining to a service to be provisioned by each one of the hospitality establishments

552

Receive, in the centralized user access management system, a notification indicating that the hospitality user boards on a first hospitality establishment of the multiple establishments    554

Determine, by the centralized user access management system, that the hospitality user is authenticated to access service to be provisioned by the first hospitality establishment    556

Send the service type data and the user preference data of the user access management profile to service provisioning manager of the hospitality establishment    558

Identify a service provisioning device associated with the hospitality user and connected to the network of the hospitality establishment

560

Cause the service provisioning device to provision a service to the hospitality user, according to the service type data and the user preference data    562

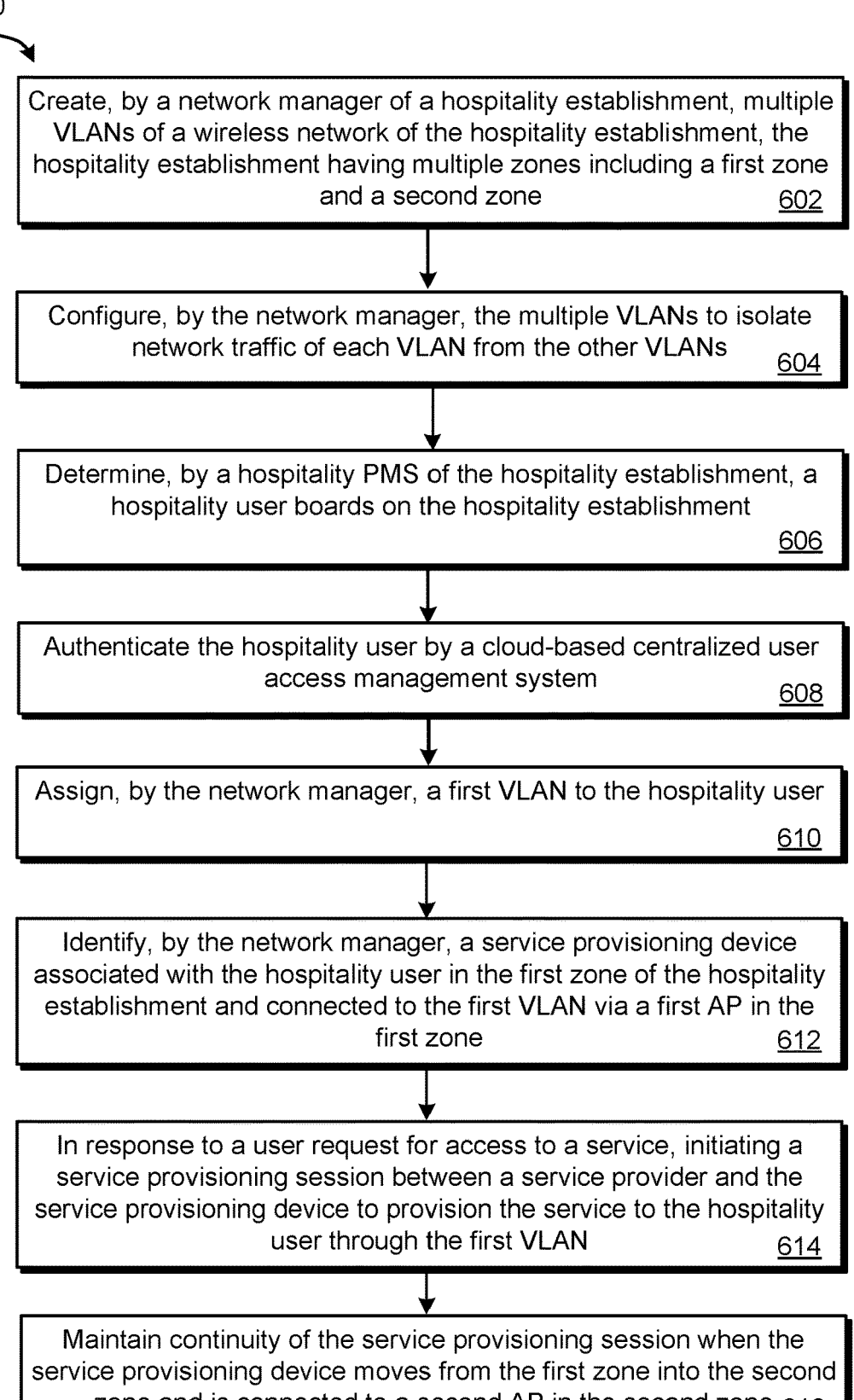

Create, by a network manager of a hospitality establishment, multiple VLANs of a wireless network of the hospitality establishment, the hospitality establishment having multiple zones including a first zone and a second zone     602

Configure, by the network manager, the multiple VLANs to isolate network traffic of each VLAN from the other VLANs     604

Determine, by a hospitality PMS of the hospitality establishment, a hospitality user boards on the hospitality establishment     606

Authenticate the hospitality user by a cloud-based centralized user access management system     608

Assign, by the network manager, a first VLAN to the hospitality user     610

Identify, by the network manager, a service provisioning device associated with the hospitality user in the first zone of the hospitality establishment and connected to the first VLAN via a first AP in the first zone     612

In response to a user request for access to a service, initiating a service provisioning session between a service provider and the service provisioning device to provision the service to the hospitality user through the first VLAN     614

Maintain continuity of the service provisioning session when the service provisioning device moves from the first zone into the second zone and is connected to a second AP in the second zone 616

WORKING
MEMORY

760

OPERATING
SYSTEM

APPLICATION(S)

765

735

PROCESSOR(S) 710

STORAGE DEVICE(S) 725

INPUT DEVICE(S) 715

OUTPUT DEVICE(S) 720

COMMUNICATIONS
SUBSYSTEMS 730

CENTRALIZED USER ACCESS MANAGEMENT AND PERSONALIZED SERVICE PROVISIONING

BACKGROUND OF THE DISCLOSURE

A hospitality chain usually consists of multiple discrete hospitality environments or establishments such as hotels, resorts, or lodges across multiple geographic areas. Each one of these hospitality establishments may also be a multi-dwelling unit (MDU) consisting of multiple zones, each zone catering to specific needs and providing different functionalities to hospitality users. However, hospitality users traversing these hospitality establishments may encounter challenges that hinder their access to services (e.g., Internet), including the need for repeated authentication, lack of personalized attention, and inconsistencies in service delivery. There is a need for personalized service provisioning within the hospitality environment to enhance the overall user experience and improve convenience, consistency, and tailored services in a hospitality environment.

BRIEF SUMMARY OF THE DISCLOSURE

In accordance with some embodiments of the present disclosure, a method is provided. In one example, a method includes creating, by a cloud-based centralized user access management system (CUAMS), a user profile for a hospitality user of a hospitality chain. The hospitality chain includes multiple hospitality establishments, the user profile includes a wireless network access profile and a user preference profile, the wireless network access profile includes a user ID and user credential, and the user preference profile includes service type data and user preference data pertaining to a service to be provisioned by each one of the multiple hospitality establishments. The method further includes receiving a request for authentication in an access point (AP) connected to a wireless network of one of the hospitality establishments. The request is sent from a wireless device associated with the hospitality user and connected to the AP, and the request includes the user ID and a user-provided credential. The method further includes performing a cloud-based authentication process to determine an authentication status of the hospitality user by the CUAMS, sending the authentication status of the hospitality user to a hospitality property management system (PMS) of the hospitality establishment, determining a user registration status of the hospitality user by the hospitality PMS, and in response to an active authentication status, providing access to the wireless network to the wireless device, based on the user registration status of the hospitality user. The method may be implemented by a computer device or system.

In accordance with some embodiments of the present disclosure, systems for provisioning service to hospitality users are provided. In one example, a system for provisioning a service to a hospitality user of a hospitality chain is provided. The hospitality chain includes multiple hospitality establishments, and the system includes a cloud-based CUAMS, a hospitality PMS of each one of the hospitality establishments, and one or more service provisioning devices in connection with the hospitality PMS. Each hospitality PMS may further include a service provisioning manager and a network manager. The CUAMS is configured to create, in the CUAMS, a user profile for the hospitality user. The user profile includes a wireless network access profile and a user preference profile, the wireless network access profile includes a user ID and user credential, and the user preference profile includes service type data and user preference data pertaining to a service to be provisioned by each one of the plurality of hospitality establishments; The CUAMS is further configured to receive, in the CUAMS, a request for authentication from a wireless device associated with the hospitality user and connected to an AP of a wireless network of one of the hospitality establishments, and the request includes the user ID and a user-provided credential. The CUAMS is further configured to perform a cloud-based authentication process to determine an authentication status of the hospitality user, and send the authentication status of the hospitality user to the hospitality PMS. The hospitality PMS of the system is configured to determine a user registration status of the hospitality user and in response to an active authentication status, provide access to the wireless network to the wireless device by the network manager, based on the user registration status of the hospitality user.

In another example, a system includes one or more processors and a computer-readable storage media storing computer-executable instructions. The computer-executable instructions, when executed by the one or more processors, cause the system to create, in the CUAMS, a user profile for the hospitality user. The user profile includes a wireless network access profile and a user preference profile, the wireless network access profile includes a user ID and user credential, and the user preference profile includes service type data and user preference data pertaining to a service to be provisioned by each one of the plurality of hospitality establishments. The instructions when executed by the one or more processors further cause the system to receive, in the CUAMS, a request for authentication from a wireless device associated with the hospitality user and connected to an AP of a wireless network of one of the hospitality establishments, and the request includes the user ID and a user-provided credential. The instructions when executed by the one or more processors further cause the system to perform a cloud-based authentication process to determine an authentication status of the hospitality user, send the authentication status of the hospitality user to the hospitality PMS, determine a user registration status of the hospitality user, and in response to an active authentication status, provide access to the wireless network to the wireless device, based on the user registration status of the hospitality user.

In accordance with some embodiments, the present disclosure also provides a non-transitory machine-readable storage medium encoded with instructions, the instructions executable to cause one or more electronic processors of a system to perform any methods or operations thereof described herein.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5A is a flow diagram illustrating an example method for service provisioning according to various embodiments.

FIG. 5B is a flow diagram illustrating another example method for service provisioning according to various embodiments.

FIG. 6 is a flow diagram illustrating another example method for service provisioning according to various embodiments.

DETAILED DESCRIPTION OF THE DISCLOSURE

Overview

Figure 1A:
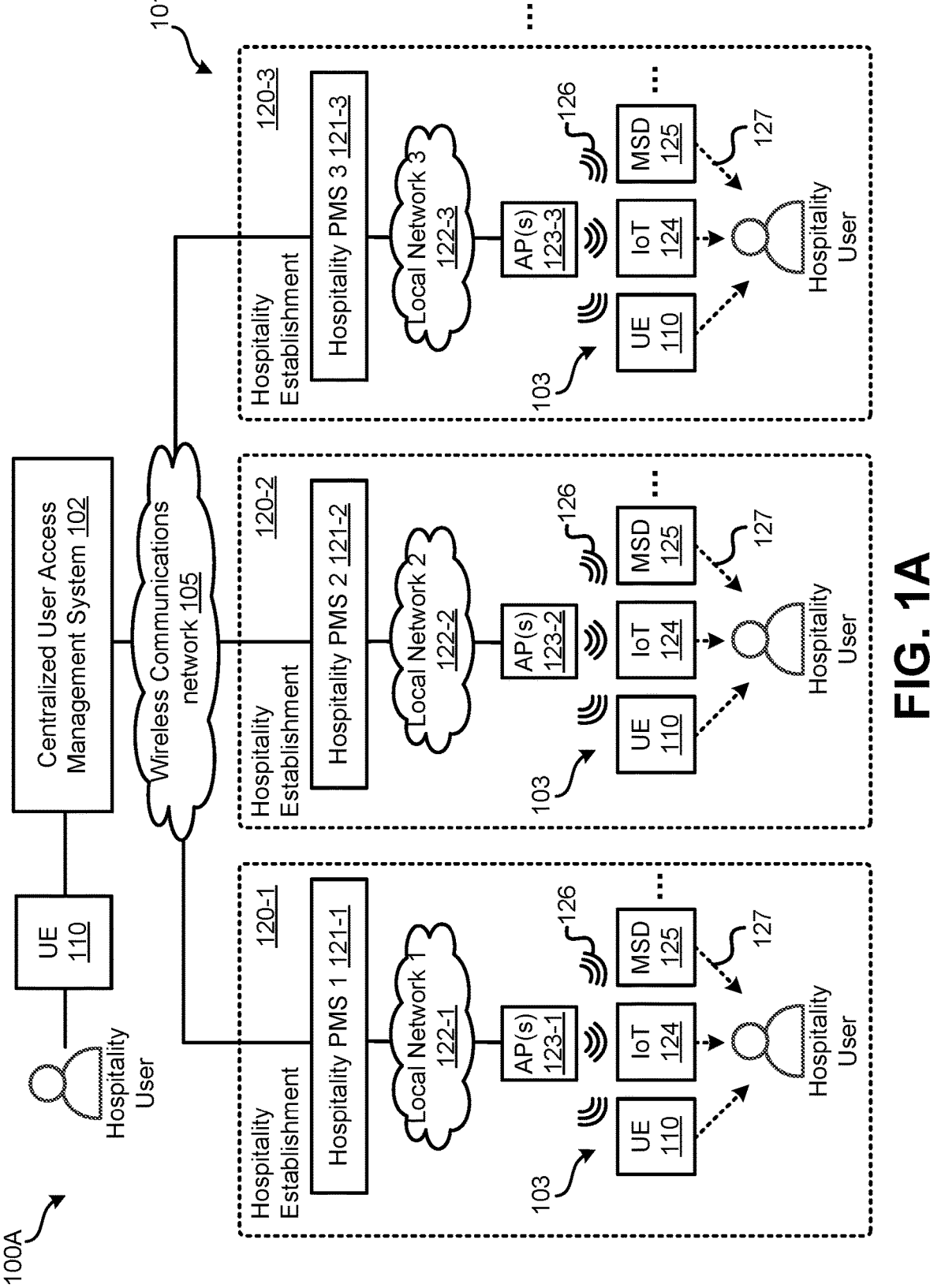
FIG. 1A is a block diagram illustrating an example of a communications system according to various embodiments.

Traditionally, when a hospitality user, such as a hotel guest, arrives at a hotel, they are often required to go through a manual authentication process to gain access to essential services like the hotel's wireless network, including Internet access. This authentication typically occurs on the hotel's network infrastructure hardware, and the user is often tasked with inputting their user identifier (e.g., hotel room number or email address) and corresponding credentials. This process can be cumbersome and less than ideal for users, potentially leading to a less-than-optimal experience during their stay.

Moreover, services provided to users in a hospitality environment have traditionally been standardized and uniform. While hotels may categorize users into different classes or groups (e.g., based on room type or membership status), the level of service differentiation within these groups is generally limited and doesn't extend to a highly personalized or individualized level. This lack of personalization can leave guests feeling like they are receiving a one-size-fits-all experience, which may not fully cater to their unique preferences and needs. Therefore, there is a need for more efficient and personalized service provisioning in hospitality environments.

The present disclosure provides devices, systems, and methods generally related to provisioning services to hospitality users, personalization of services for hospitality users, and improving user experiences of hospitality users. One insight provided in the present disclosure is related to an integrated service provisioning system combining a cloud-based centralized user access management system (CUAMS) and a hospitality property management system (PMS). The CUAMS allows a hospitality user to create a single master account associated with a hospitality chain. This master account serves as a secure gateway to access services (e.g., Internet access, Wi-Fi access, etc.) provided by multiple hospitality establishments within the same hospitality chain. Hospitality users of a hospitality chain may travel among the different hospitality establishments and use the single account to access services provided by hospitality establishments without the need for authentication repeatedly. The CUAMS may also provide robust and secure cloud-based authentication protocols to protect user credentials and any personal and sensitive information of the user. The cloud-based authentication process also eliminates the need for users to manually input their credentials during the authentication process and enables automatic and seamless access to services. In addition, the service provisioning system can create and manage detailed user profiles for the hospitality users. These user profiles can encompass a wide range of data, including service preferences, user behavior, historical usage records, and more. This data allows for a highly personalized service experience tailored to the unique preferences and needs of each individual hospitality user in the hospitality establishment.

The hospitality PMS of a hospitality establishment can streamline various service modules across the hospitality establishment, customize and personalize services provisioned to the user based on the data and information provided in the user profiles provided by the CUAMS. According to some embodiments, the hospitality PMS can create and manage a virtualized local area network (VLAN) for a hospitality user or a group of hospitality users. These VLANs, also referred to as personalized VLANs herein, act as personalized gateways to a spectrum of services within the hospitality establishment. Personalized VLANs in a hospitality establishment may provide a range of benefits. Firstly, personalized VLANs provide a secure and isolated environment for each hospitality user or each group of hospitality users, ensuring that their communication of data and information remains private and protected from unauthorized access. This isolation also prevents hospitality users from accessing (either inadvertently or intentionally) other hospitality users' devices or resources, thereby enhancing network security. Moreover, personalized VLANs enable the customization of services and allow for tailored options, which improves hospitality user satisfaction.

Example Devices, Systems, and Methods

FIG. 1A is a block diagram illustrating an example of a communications system 100A (also referred to as "system 100A") according to various embodiments. In some embodiments, system 100A is a service provisioning system for providing access to services to a user of hospitality chain (i.e., a hospitality user). In the illustrated example, system 100A includes, among other components, a hospitality chain 101 including multiple hospitality establishments 120, a centralized user access management system 102 (hereinafter CUAMS 102), and multiple hospitality property management systems 121 (hereinafter "hospitality PMS 121") respectively corresponding to the multiple hospitality establishments 120.

In the illustrated example, the multiple hospitality establishments 120 includes a first hospitality establishment 120-1, a second hospitality establishment 120-2, and a third hospitality establishment 120-3. Although more or few hospitality establishments may be included in the hospitality chain 101 in other embodiments. The first hospitality establishment 120-1 further includes a first hospitality PMS 121-1, the second hospitality establishment 120-2 further includes a second hospitality PMS 121-2, and the third hospitality establishment 120-3 further includes a third hospitality PMS 121-3. The CUAMS 102 is in communication with each one of the multiple hospitality PMS 121 respectively through a wireless communications network 105 (hereinafter communications network 105 or wireless network 105).

A local network 122 may be established with each hospitality establishment 120 and is connected to the hospitality PMS 121. For example, the first hospitality PMS 121-1 is connected to a first local network 122-1 in the first hospitality establishment 120-1, the second hospitality PMS 121-2 is connected to a second local network 122-2 in the second hospitality establishment 120-2, and the third hospitality PMS 121-3 is connected to a third local network 122-3 in the third hospitality establishment 120-3.

A hospitality user may communicate with the CUAMS 102 using a user equipment 110 (UE 110) for various purposes. Within a hospitality establishment 120, the hospitality user may get access to various services 127 provisioned by service provisioning devices 103. Examples of the service provisioning devices 103 include UE 110, Internet-of-Things (IoT) device(s) 124, media streaming device(s) (MSD) 125, or other wireless devices generally in any form of computerized device that is capable of communicating with a wireless network. The service provisioning devices 103 may be connected to the local network through wireless transmission 126 and communicate with the hospitality PMS 121 (e.g., the first hospitality PMS 121-1, the second hospitality PMS 121-2, and the third hospitality PMS 121-3) through one or more access points 123 (AP 123) (e.g., a first AP 123-1 connected to the first local network 122-1, a second AP 123-2 connected to the second local network 122-2, and a third AP 123-3 connected to the third local network 122-3).

According to the present disclosure, the term "hospitality" or "hospitality establishment" broadly refers to a comprehensive property or premises that encompasses a diverse and multi-unit environment where accommodations and services are provided to a variety of tenants, residents, occupants, guests, or workers therein. "Hospitality" used herein encompasses a diverse spectrum of environments, ranging from single-family houses to lodging establishments like hotels, resorts, restaurants, and motels, and to expansive complexes such as apartment buildings, senior living communities, short-term rental properties, student housing, commercial establishments such as office spaces, meeting facilities, retail establishments such as shops, grocery stores, supermarkets, manufacturing establishments such as factories, production and operation places. A hospitality or hospitality establishment may also include multiple units, rooms, divisions, or workspaces, each designed to cater to the specific needs and preferences of its tenants, residents, guests, occupants, or workers.

According to the present disclosure, a hospitality chain is referred to as an organization that encompasses one or more distinct hospitality establishments. In some embodiments, the hospitality chain may operate under a shared brand or ownership umbrella. Each hospitality establishment within the chain may maintain its own hospitality PMS responsible for managing user registration and onboarding, as well as facilitating service provisioning to hospitality users (e.g., guests or patrons). These hospitality PMS, while maybe part of the same hospitality chain, can function independently, allowing each establishment to tailor its services to the unique needs and preferences of its users. A hospitality PMS used herein refers to a specialized platform of the hospitality establishment to manage various information and facilitate, manage, and optimize provisioning of services to hospitality users.

As mentioned above, the service provisioning devices 103 may include various electronic devices in communication with the local network 122 and capable of receiving an instruction from hospitality PMS 121 or other service providers and executing the instruction to provision service to the hospitality user. Examples of the service provisioning devices 103 include the UE 110, which may be owned, operated, controlled by the hospitality users and brought to the hospitality establishment. Examples of UE 110 include mobile devices, personal computers, smartphones, tablet computers, laptop computers, desktop computers, gaming devices, smart televisions, wearables, streaming sticks, smart projectors, virtual reality and augmented reality (VR/AR) devices, integrated receiver decoders. Examples of the service provisioning devices 103 may also include MSD 125 such as televisions (TV) and smart TVs, user devices, set top boxes, satellite set top box, gaming consoles, and so on. Within the hospitality establishment, the MSD 125 may be fixed in a location such as guest room, lobby, gym, conference room, dining room, swimming pool, and so on. For example, an MSD 125 may be a TV permanently installed in a guest room of the hospitality establishment. Examples of the service provisioning devices 103 may also include IoT devices 124 such as smart thermostats, smart water heater, smart lighting devices, voice assistants, smart locks, water and energy monitoring devices, security cameras, smart smoke detectors, smart carbon monoxide detectors, and so on.

For example, an IoT device 124 may include one or more sensors to detect and monitor the environment, such as temperature sensors, humidity sensors, motion detectors, light sensors, occupancy sensors, and so on. The IoT device 124 may further include a computer system or device that can process data from sensors, run the IoT device's firmware, and communicate with external systems like the hospitality PMS 121. The IoT device 124 may be programmed to communicate with the hospitality PMS 121 using specific communication protocols or APIs to facilitate data exchange and service provisioning instructions. The firmware of the IoT device 124 may include logic for provisioning services based on instructions received from the hospitality PMS 121. For example, the logic may involve configuring a service setting, adjusting a service parameter such as room conditions (e.g., temperature and lighting), sending notifications, or controlling in-room devices.

The local network 122 within the hospitality establishment 120 may also be referred to as a Local Area Network (LAN). The local network 122 may employ wired (e.g., Ethernet) and wireless (e.g., Wi-Fi) connections to link the service provisioning devices 103 within the hospitality establishment 120. The local network 122 enables the provisioning and delivery of various services within the hospitality establishment 120 to hospitality users, such as Internet access, VoIP (Voice over Internet Protocol) communication, media streaming, video surveillance, environmental controls (e.g., room temperature, light, water temperature, etc.), point-of-sale (POS) systems, among others.

The APs 123 are generally network devices that extend the network coverage within the hospitality establishment 120 and enable the service provisioning devices 103 to connect to the local network 122 and/or the wireless network 105 and communicate with the hospitality PMS 121 or other components in the system 100A. In some embodiments, an AP 123 may be installed within one room or unit or zone of the hospitality establishment 120 and exclusively used by service provisioning devices 103 within the room or unit. Alternatively, an AP 123 may be installed in a common area of the hospitality establishment 120 and shared by multiple service provisioning devices 103 across various rooms or units or zones within the hospitality establishment 120.

As mentioned above, the integration of the CUAMS 102 and the hospitality PMS 121 in the system 100A allows for providing a seamless and convenient experience for hospitality users across different hospitality establishments 120, such as 120-1, 120-2, and 120-3. A single hospitality user, when moving between these geographically distinct hospitality establishments 120, can access services without the need for repetitive authentication processes. As an example, a hospitality user plans to stay at a hospitality establishment 120, for example, the first hospitality establishment 120-1. Before arrival, the hospitality user can engage with the CUAMS 102 through the UE 110 to create a master account within CUAMS 102. This master account is retained by CUAMS 102 and serves as a repository for the user profile and user credentials (authentication data). CUAMS 102 verifies and authenticates the user and indicates an active authentication status, and this active authentication status is communicated to the first hospitality PMS 121-1. Consequently, upon reaching the first hospitality establishment 120-1, the hospitality user may seamlessly access a range of services without the need for further authentication.

In some embodiments, the master account associated with the hospitality user, along with the active authentication status, can extend the utility beyond the first hospitality establishment 120-1. Subsequently, when the hospitality user moves to a different hospitality establishment, such as the second hospitality establishment 120-2, the existing master account, established and authenticated by CUAMS 102, can empower the hospitality user to access services provided by the second hospitality establishment 120-2 without necessitating additional authentication steps. Accordingly, this user-centric approach provides a hassle-free experience for the hospitality users as they transition between different hospitality establishments and locations within the hospitality chain, streamline access to services, and enhance overall convenience.

It should be noted that the CUAMS 102 can employ various methods and technologies to provide centralized authentication management for hospitality users. While the master account as described above may be one example approach, the CUAMS 102 can incorporate additional or alternative methods and features to enhance security, convenience, and flexibility for hospitality users. Details of the CUAMS 102 and the hospitality PMS 121 are described below with reference to FIG. 1B.

Figure 1B:
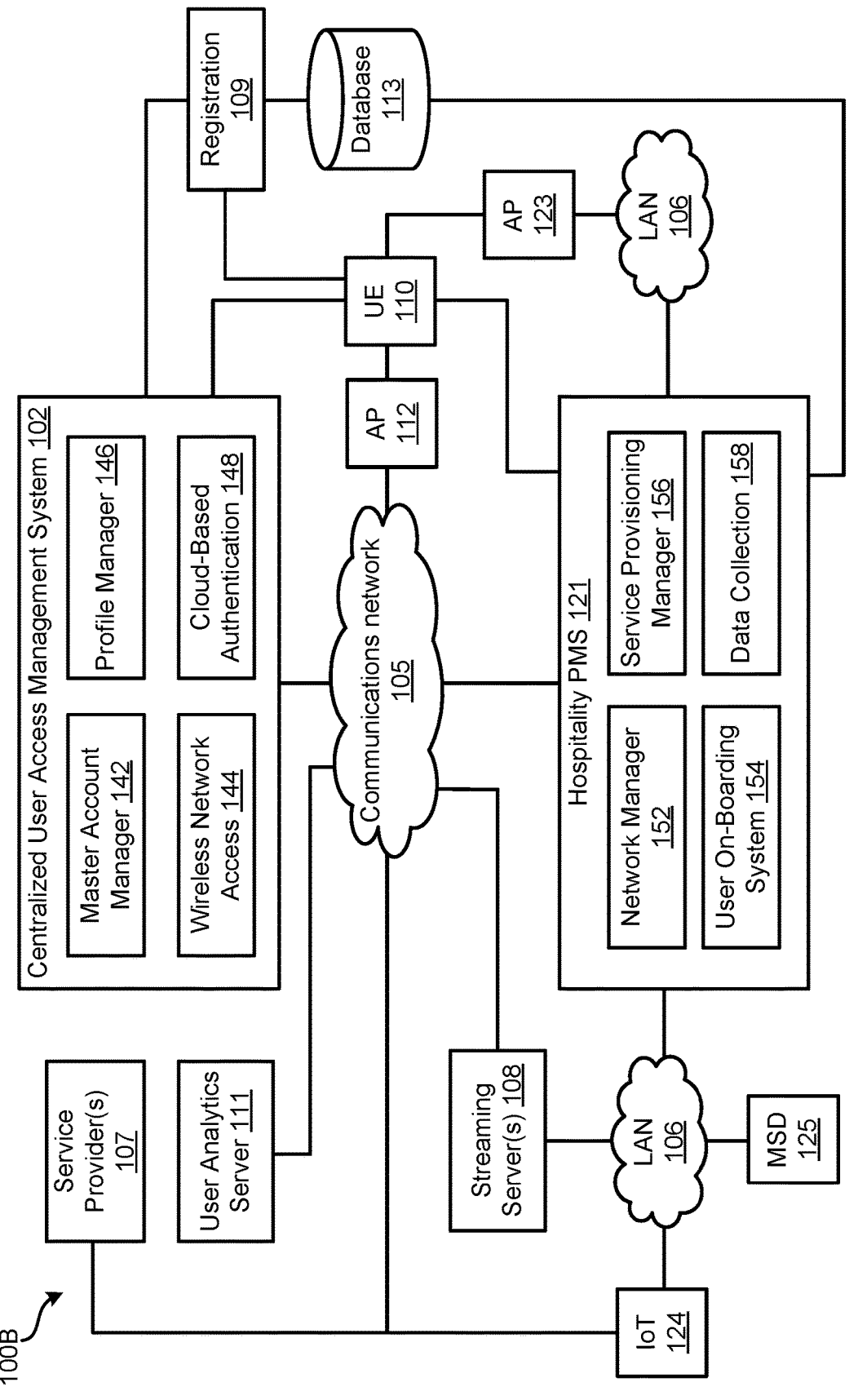
FIG. 1B is a block diagram illustrating another example of a communications system according to various embodiments.

FIG. 1B is a block diagram illustrating an example of a communications system 100B (also referred to as "system 100B") according to various embodiments. In the illustrated example, the system 100B includes, among other components, the CUAMS 102, a hospitality PMS 121, one or more service providers 107, one or more streaming servers 108, a registration system 109, a user analytics server 111, AP 112, a database 113, UE 110 operated by a hospitality user, one or more IoT devices 124, and one or more MSDs 125. Various components of the system 100B may be connected to a wireless network 105 and/or one or more LANs 106. The components included in the system 100B may be a hardware component, a software component, or a combination thereof.

In the illustrated example, the CUAMS 102 further includes, among other components, a master account manager 142, a wireless network access provisioning manager 144, a profile manager 146, and a cloud-based authentication system 148. The hospitality PMS 121 further includes, among other components, a network manager 152, a user on-boarding system 154, a service provisioning manager 156, and a data collection component 158. In some embodiments, the network manager 152 and the service provisioning manager 156 are independent from the hospitality PMS 121.

In the CUAMS 102, the master account manager 142 can facilitate the creation of a master account for each hospitality user who intends to access services across different establishments within the same hospitality chain. Upon receipt of a request for account creation from a hospitality user, the master account manager 142 may initiate a user registration process involve providing basic user information, such as a username, email address, or mobile number, authenticate the user during the registration process, and facilitate setting up the master account by choosing a secure password, configuring preferences, and providing additional information that can be used for personalization. Hospitality users can use their master account credentials (e.g., username and password) to access services (e.g., access to wireless network or Internet) in any hospitality establishments affiliated with the same hospitality chain. This eliminates the need for users to create separate accounts or undergo repetitive authentication processes when moving between different hospitality establishments. The master account created and managed by the master account manager 142 may also serve as a repository for user account profiles and preferences. This enables users to maintain consistent preferences and access customized services regardless of their current location.

The wireless network access provisioning manager 144 is responsible for managing the access to wireless network (e.g., Internet) within each one of the hospitality establishments of the hospitality chain by the hospitality users. The profile manager 146 is responsible for creating and managing various profiles such as account profile, user profiler, wireless network access profile, user preference profile, and so on. The cloud-based authentication system 148 is responsible for authenticating the hospitality users and determining an authentication status of the hospitality user. The authentication status may indicate whether the hospitality user is authenticated (denoted as an active authentication status) or not authenticated ((denoted as an inactive authentication status) to access the services provided by the hospitality establishment 120. The CUAMS 102 may timely transmit the authentication status to the hospitality PMS 121 before or during onboarding of the hospitality user onto the hospitality establishment 120. The cloud-based authentication system 148 may continuously monitor user activity to detect any changes in authentication status.

The registration system 109 can include one or more computer devices or computer systems (e.g., the example shown in FIG. 7) and may be operated or configured by an administrator that is tasked with managing access to the communications network 105 (e.g., a wireless network or Internet). In some embodiments, the registration system 109 may be operated by a third-party administrator independent from the CUAMS 102 or the hospitality establishment 120. In some embodiments, the registration system 109 may be a part of the CUAMS 102. In some embodiments, the registration system 109 may be a part of the hospitality PMS 121. When one or more of a hospitality user's wireless devices (e.g., UE 110) is to be provided access to the wireless network, registration system 109 may be used to generate a unique pre-shared key (PSK). The hospitality user can select a wireless network based on the wireless network's ID (e.g., Service Set Identifier (SSID)) and input a PSK. In some embodiments, the PSK can be particular to a hospitality user (or group of hospitality users) and can have been provided to the hospitality user separately (e.g., in a registration email, via text message, orally, on paper, etc.) to the hospitality user.

In some embodiments, the hospitality user may be permitted to define his/her own PSK or a portion of the PSK (with registration system 109 defining the remainder). Registration system 109 may be used to transmit a message to the hospitality user indicative of the unique PSK, the SSID of the wireless network 105, a unique user identifier associated with the hospitality user (e.g., a username, an email address, a customer loyalty number, a hotel room number, a MAC address of the wireless device, an employee ID, a birthdate, a membership number, a biometric data (e.g., fingerprint or face recognition), reservation number, social security number, user-created password, etc.) and/or other details and/or rules that may be pertinent to the hospitality user, such as the times and dates during which the user is authorized to access the wireless network 105 and/or the LAN 106, the bandwidth allocated to the hospitality user, access and/or creation of personal area networks (PANs) within the hospitality establishment 120, and access to virtual local area networks (VLANs) within the hospitality establishment 120, etc.

Registration system 109 can transmit the message in many forms to the hospitality user. For instance, an email may be transmitted to an email address on record for the hospitality user; a text message may be sent to a mobile phone number of the hospitality user; a paper letter may be addressed and mailed to the hospitality user (e.g., as part of a reservation or welcome package for the hospitality establishment 120); a representative or automated system may call (or otherwise talk to) the hospitality user (e.g., during user onboarding onto the hospitality establishment 120), a message may be presented on a display screen for the hospitality user to read, a code may be presented for a hospitality user to image with his device (e.g., UE 110), an NFC, Bluetooth®, or other short-range data transfer may be performed, etc.

Registration system 109 may be in direct communication with the CUAMS 102 or may communicate with the CUAMS 102 via a communications network, such as the wireless network 105. Alternatively, registration system 109 and the CUAMS 102 may function as software-implemented components of the same server system. In some embodiments, registration system 109 can directly access database (s) 113.

The database(s) 113 may include, among other components, a PSK database, a user profile database, and a rule database. The PSK database may be used to store the PSKs associated with the hospitality user's wireless devices (e.g., UE 110). The user profile database may be used to store the wireless network access profile associated with the hospitality user or the master account of the hospitality user. The rule database may be used to store pre-established rules for wireless access.

In addition to the unique PSK being provided to the user, the wireless network access profile may be created in user profile database based on the data obtained in the CUAMS 102 and the registration system 109. The wireless network access profile can include: the unique PSK, the SSID of the wireless network (e.g., the wireless network 105 or the LAN 106), the VLAN IDs, the unique user ID associated with the hospitality user, among others. The rules database may include rules that are pertinent to the hospitality user (e.g., times and dates during which access to the wireless network is permitted via the wireless network access profile, the amount of bandwidth allocated, access to PANs, access to VLANs), and data relevant to the use of the wireless network access profile (e.g., whether the unique PSK has been used for wireless network access previously).

APs 112 and 123 can represent a device that creates a wireless network or serves as a portion of a wireless network through which one or more wireless devices (e.g., UE 110, IoT device 124, and MSD 125), if properly authorized, can access the wireless network 105 (e.g., Internet) and/or other public or private local networks (e.g., local networks of FIG. 1A and LAN 106 of FIG. 1B). APs 112 and 123 may use any suitable protocol as the security protocol for protecting network communications, such as WPA, WPA2, and WPA3. It should be understood that embodiments detailed herein may be adapted and used with other communication protocols and security protocols. Once access for a wireless device, such as the UE 110, IoT device 124, and MSD 125, to the wireless network is granted, the wireless device may also be able to communicate with some or all wired devices connected with the wireless network. In some embodiments, the connectivity pathway for a wireless device in the hospitality establishment 120 can involve accessing the LAN 106 through AP 123 within the hospitality establishment. Subsequently, the wireless device may access the broader wireless network 105 (e.g., Internet) through the network manager 152 of the hospitality PMS 121. The network manager 152 may include an Internet gateway serving as the link between the LAN 106 and the wireless network 105 for routing data between the LAN 106 and external Internet servers.

For the example of IoT device 124 (e.g., a sensor device, home automation device), no user interface or a limited user interface may be present. While IoT device 124 may require or benefit from network connectivity, it may be difficult or impossible for a hospitality user to perform some forms of network authentication for IoT device. In some embodiments, to configure IoT device, an application may be executed on another device, such as the UE 110. Through such a device, the hospitality user may be able to provide credentials that IoT device 124 can use to perform authentication with AP 123.

When a hospitality user desires a service provisioning device 103 to initially communicate with a wireless network such LAN 106, the hospitality user may input or select the correct SSID and input the unique PSK into the service provisioning device 103 as provided by the registration system 109 and stored in the user profile created by the CUAMS 102.

The service provisioning device 103 such as the UE 110, for example, may perform an initial pairing procedure to determine if the unique PSK grants access to the wireless network created by AP 123. UE 110 may also generate a commit message to be used in the key exchange process, for example, based on the Simultaneous Authentication of Equal (SAE) protocol unique to the WPA3-based authentication process. It is noted that the SAE process may use a more secure method of authentication, which prevents attackers from using offline dictionary attacks to discover the Wi-Fi password. SAE process may use a unique password (e.g., derived from the commit message) for each connection, which is generated by the UE 110 and the AP 123 during the authentication process. In some embodiments, a handshaking procedure, such as the WPA3 4-way handshake, may be performed after the SAE is performed.

AP 123 may transmit the messages received from UE 110, along with any other data needed, such as the EAPOL frame, the AP MAC address, and the MAC address of the UE 110 to the CUAMS 102 via the wireless network 105 (or, additionally or alternatively, some other public and/or private networks or directly). In some embodiments, when a SAE protocol is used in the authentication process, AP 123 may communicate with the UE 110 by transmitting a challenge message in response to a request sent from the UE 110. AP 123 may further transmit a hash value generated by the UE 110 to the cloud-based authentication system 148 of CUAMS 102 to verify the hash value. The cloud-based authentication system 148 can include one or more computer server systems that communicate with one or more databases 113 stored using non-transitory processor-readable mediums.

Database(s) 113 may store wireless network access profiles for the hospitality users. For instance, the wireless network access profile for a hospitality user may include: a permissible time range for access; a permissible date range for access; whitelisted and/or blacklisted MAC addresses; an amount of bandwidth; a total amount of uplink and/or downlink data permissible within a given time period (e.g., one month); permissible or impermissible uses (e.g., no video streaming); whether further authentication is needed, a level of access, which networks are permitted to be accessed, etc.

In some embodiments, data from the wireless network access profile is transmitted via wireless network 105 (or other networks such as local networks or LAN of the hospitality establishment 120) to AP 112 or AP 123. In such embodiments, AP 112 or AP 123 may analyze the contents of the wireless network access profile to determine whether UE 110 is to be provided access to wireless network. In other embodiments, the determination of whether access is permitted is performed by the cloud-based authentication system 148. the cloud-based authentication system 148 can compare the user credential stored in the wireless network access profile and the user-provided credential included in the authentication request sent from the wireless device to identify presence or absence of a match. A match indicates an active authentication status.

In some embodiments, data stored as part of the wireless network access profile in database(s) 113 may be dynamic. For instance, when the PSK associated with the wireless network access profile is used by UE 110 to connect with any AP for the first time, one or more additional steps may be required to be performed. Data within the wireless network access profile may indicate whether or not the PSK has previously been used to connect with an AP for which cloud-based authentication system 148 manages access. For instance, after communication between UE 110 and AP 112 or AP 123 is established using the PSK but before AP 112 or AP 123 permits network access (e.g., access to wireless network 105 or other networks within the hospitality establishment 120), terms of service may be transmitted to the UE 110 for presentation to and acknowledgement by the hospitality user of the UE 110. Once the terms of service are assented to and an indication of such is received by AP 112 or AP 123, AP 112 or AP 123 may transmit an indication as such to cloud-based authentication system 148 to modify the wireless network access profile associated with the PSK to indicate that the terms of service have been agreed to and do not need to be presented again. In other embodiments, the terms of service may be provided at a different step or included in different versions of the user profile managed by the wireless network access provisioning manager 144. For instance, in some embodiments, in order to receive the PSK and/or SSID, a hospitality user may first be required to assent to terms of service.

In some embodiments, in response to a UE 110 being successfully granted access to the wireless network 105 (or other networks within the hospitality establishment 120), the MAC address (or some other form of identifier of the UE 110) may be stored and associated with the wireless network access profile or the PSK stored in the wireless network access profile. If the UE 110 attempts to reconnect to the wireless network in the future, rather than repeating the entirety of the provisioning process, the MAC address match may be identified.

In some embodiments, additional security beyond the UE 110 being used to supply a valid PSK may be desired by the administrator that operates registration system 109. As previously noted, additional information, such as a unique user identifier (e.g., email address, password) may be stored as part of a wireless network access profile in database(s) 113. After the PSK has been validated, the AP 112 or AP 123 may request that the UE 110 supply additional information. For instance, AP 112 or AP 123 may request an email address, loyalty identifier/number, guest room number, membership member, or some other form of unique and verified user identifier from the UE 110. A hospitality user may then supply the email address (or other form of unique user identifier) that was provided during the registration process to registration system 109. Either AP 112 or AP 123 or the cloud-based authentication system 148 may verify whether the provided unique user identifier matches the stored unique user identifier within the wireless network access profile. If a match is present, access to network access may be granted. If a match is not present, access to network access may not be granted and/or the wireless network access profile may be disabled. Depending on the desire of the administrator of registration system 109, such an additional security step may be performed only once for a given wireless network access profile, may be performed each time the UE 110 connects to a new AP.

Additional examples of the authentication examples using PSK are described in U.S. Patent Application Publication No. 20210099876, which is incorporated herein by reference.

In some embodiments, the cloud-based authentication system 148 may also have capacity and be operable to perform a key exchange process following a SAE-based or a DPP-based protocol. Examples of the SAE-based or DPP-based protocols for authentication are described in U.S. patent application Ser. No. 18/445,079, which is incorporated herein by reference.

Within the hospitality establishment 120, the network manager 152 is responsible for managing the local networks (e.g., local networks 122 in FIG. 1A or LAN 106 in FIG. 1B) within the hospitality establishment 120 and provisioning access to wireless networks (e.g., Internet) to authenticated hospitality users. The user on-boarding system 154 is responsible for facilitating the onboarding of hospitality users onto the hospitality establishment, enabling hospitality users to register for network access by providing necessary information and agreeing to terms and conditions, managing access control policies and user privileges to ensure that the hospitality users have the appropriate level of access based on their authentication status and user profile data.

In some embodiments, the user on-boarding system 154 further includes a hospitality user registration unit responsible for registering the hospitality user, determining a user registration status of the hospitality user, determine the service provisioning devices 103 (e.g., UE 110, IoT device 124, and MSD 125) associated with the hospitality user. The user registration status of a hospitality user may indicate whether the hospitality user has completed the registration process, whether the identity of the hospitality user has been verified, whether the hospitality use has any special requirements or preferences, and scope of the service to be provisioned to the hospitality user. For example, the user onboarding system 154 can identify the guest room where the hospitality user will stay and the various service provisioning devices 103 in that guest room. The user registration status further specifies the extent and parameters of the services that can be provisioned to the hospitality user. This may include specifics like bandwidth restrictions, designated access time periods, service duration, Quality of Service (QOS) settings, and more, particularly concerning access to the wireless network or Internet services provided by the hospitality establishment. The user registration status may further specify scope of media streaming services, content restriction, streaming quality, duration of streaming services, and other settings and parameters pertaining to media streaming services.

The service provisioning manager 156 is in communication with various servicing provisioning devices 103 within the hospitality establishment, service providers 107, and streaming servers 108, and is responsible for facilitating service delivery to the servicing provisioning devices 103. The service providers 107 may be third party providers independent from the hospitality chain 101 and may offer specialized services such as wireless network access, Internet access, media streaming, content streaming, content delivery, among others over the wireless network 105. The service provisioning manager 156 may communicate or interact with the service providers 107 to integrate their offerings into the hospitality experience. Streaming servers 108 may be one example of the service providers 107 and may provide media streaming and content delivery services, such as video-on-demand or live TV, to MSD 125. The service provisioning manager 156 may coordinate access to the streaming servers to provide options to the hospitality users. The service provisioning manager 156 may identify available services and resources within the hospitality establishment 120, sending instructions to the service provisioning devices 103 to activate services (e.g., turning on in-room devices such as fixed UE 110 for the hospitality user, configuring IoT devices 124 to adjust room settings for the hospitality user, or configuring the MSD 125 to allow the hospitality user to access to streaming content). In some embodiments, the service provisioning manager 156 may utilize user profiles to personalize services for the hospitality users, such as adjusting room lighting according to the user preference extracted from the user profile, setting preferred temperature levels for the hospitality user, or recommending content based on historical preferences extracted from the user profile, among others.

The data collection component 158 of the hospitality PMS 121 is responsible for collecting user data on service usage, user interactions, and user preferences. For example, the data collection component 158 may gather information on which services hospitality users are using, how often they are used, and the duration of use, information on how hospitality users interact with different services, such as touchpoints, voice commands, app usage, or physical interactions with the service provisioning devices 103, information on user preferences, such as preferred room settings (temperature, lighting, etc.), preferred media content, dietary restrictions for dining, and other personalized choices, information on the performance of the network, such as metrics on bandwidth utilization, latency, network outages, and user feedback on overall experiences. The hospitality PMS 121 may transmit the collected user data to the user analytics server 111 for further processing to extract new or additional user characteristics and user preferences (e.g., preferences on room settings, media content, streaming services, food, etc.), which can be used to update the user profile of the hospitality user.

Figure 2:
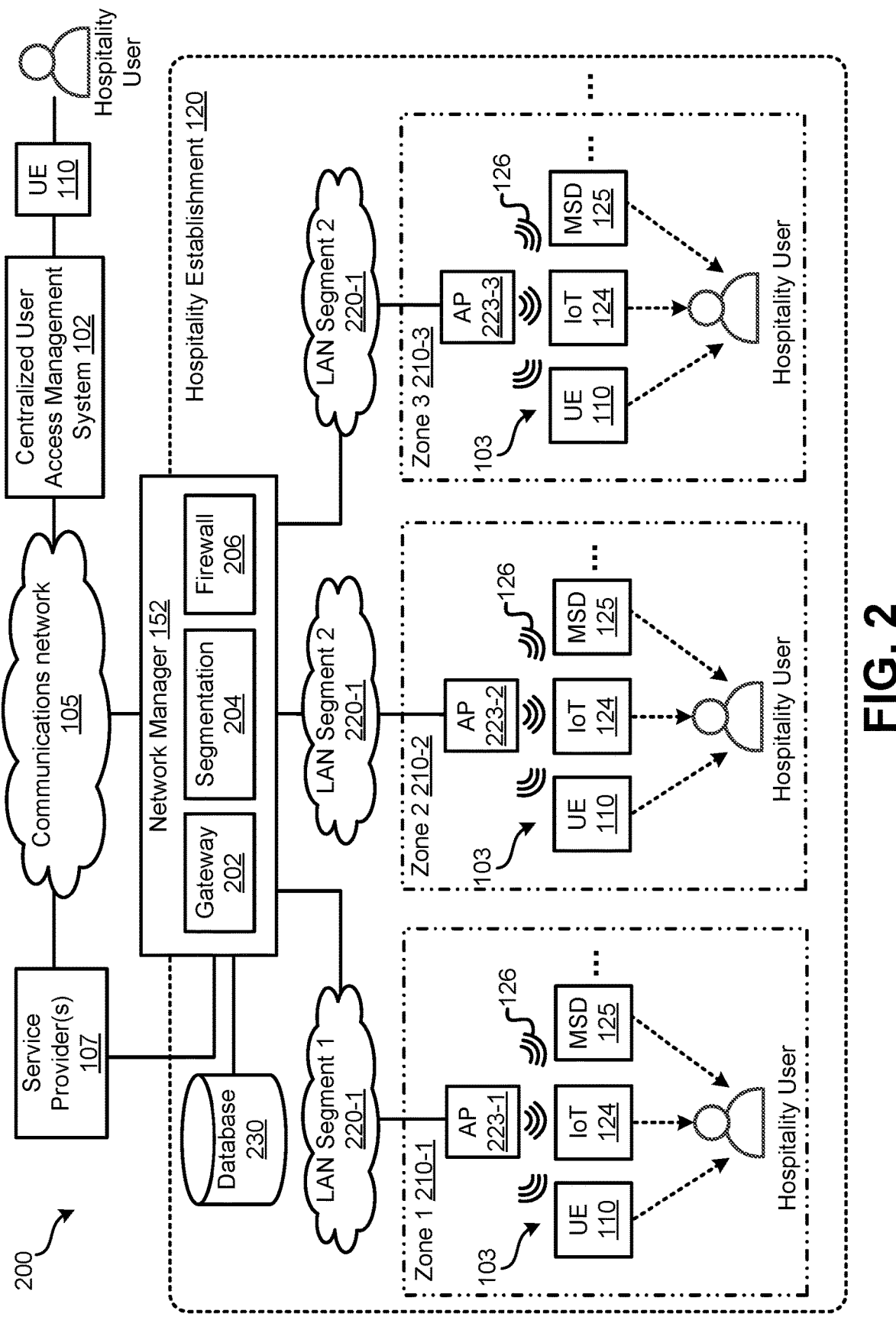
FIG. 2 is a block diagram illustrating another example of a communications system according to various embodiments.

FIG. 2 is a block diagram illustrating an example of a communications system 200 (also referred to as "system 200") according to various embodiments. System 200 is a service provisioning system for providing access to services to a hospitality user within a hospitality establishment. In the illustrated example, system 200 includes, among other components, a hospitality establishment 120 (e.g., the first hospitality establishments 120-1 of FIG. 1A), a CUAMS 102, network manager 152, database(s) 230, UE 110, and one or more service provisioning devices 103. The first hospitality establishments 120-1 may be an MDU environment (hereinafter MDU) that contains multiple compartments or separate living units within the hospitality establishment 120.

The hospitality establishment 120 is divided into multiple zones 210 (e.g., a first zone 210-1, a second zone 210-2, a third zone 210-3, etc.). In some embodiments, the hospitality establishment 120 may be divided geographically, and each zone 210 has a defined geographic boundary. Each zone 210 may include one or more units of the hospitality establishment 120, a common area, or a unit of a particular function. For example, the zones 210 may represent different floors or areas or different rooms or categories of rooms of the hospitality establishment 120, such as standard guest rooms, premium guest rooms, lobby, lounge, swimming pool, dining area, gym, conference rooms, and so on.

As mentioned above, the network manager 152 is responsible for handling the network infrastructure of the hospitality establishment 120 and may be either included in or independent from the hospitality PMS 121. The network manager 152 may further include, among other components, a network gateway 202, a network segmentation device 204, and a firewall 206. The network gateway 202 serves as the entry and exit point for data traffic between the LAN of the hospitality establishment 120 and the wireless network 105, which provides Internet connectivity. The network segmentation device 204 can be used to partition the LAN 106 and generate multiple LAN segments 220 respectively corresponding to the multiple zones 210. For example, a first LAN segment 220-1 corresponds to the first zone 210-1, a second LAN segment 220-2 corresponds to the second zone 210-2, and a third LAN segment 220-3 corresponds to the third zone 210-3. Each LAN segment 220 may have one or more APs 223 (e.g., a first AP 223-1, a second AP 223-2, a third AP 223-3, etc.). The AP 223 are provided for the UE 110 as well as other service provisioning devices 103 within each zone 210 to get access to the wireless network 105. In some embodiments, the LAN segment 220 may be a Virtual Local Area Network (VLAN). In some embodiments, the LAN segment 220 may be a subnet.

The network segmentation device 204 may be a network switch or a router with VLAN capabilities of dividing a LAN into separate LAN segments or VLANs for enhanced network management and security. Examples of the network segmentation device 204 include but are not limited to an ethernet switch that allow network administrators to configure VLANs, assign ports to specific VLANs, and control traffic between VLANs, a router that allows creating and managing VLANs directly at the router level, a Layer 3 switch that combines the functions of a traditional Ethernet switch and a router, a software-defined networking (SDN) controller, or a cloud-based network management platform.

In some embodiments, each zone 210 of the hospitality establishment 120 may represent a category of rooms or areas depending on the size, amenities, location, view, occupancy capacity, function, etc. For example, the first zone 210-1 may cover the lobby area, the second zone 210-2 may cover the premium guest rooms, the third zone 210-3 may cover standard guest rooms, and so forth. Each zone 210 is designated with specific services to be provisioned to a hospitality user through the corresponding LAN segment 220, according to a predetermined segmentation rule. The predetermined segmentation rule may be stored in database 230 connected to the network manager 152. Once the hospitality user is authenticated by the CUAMS 102, and the service provisioning devices 103 associated with the hospitality user are connected to the LAN segment 220 hosted by the corresponding AP 223, the service provisioning devices 103 may provision services specified by the predetermined segmentation rule to the hospitality user.

For example, the first zone 210-1 may be designated with limited bandwidth (e.g., 1 Mbps data rate) for Internet access; the second zone 210-2 may be designated with more bandwidth (e.g., 10 Mbps data rate); and the third zone 210-3 may be designated with normal bandwidth (e.g., 5 Mbps data rate). When a hospitality user is authenticated by the CUAMS 102 upon connecting to the LAN of the hospitality establishment 120, the network manager 152 may identify the hospitality user's location or zone within the hospitality establishment 120 and instruct the service provisioning device 103 associated with the user on how to provision access to Internet. Based on the zone where the hospitality user is located in, the service provisioning device 103 can configure the Internet access to align with the designated bandwidth. For example, a hospitality user in the first zone 210-1 would have access to the Internet with limited bandwidth (1 Mbps), a hospitality user (e.g., premium room guest) in the second zone 210-2 would enjoy higher bandwidth (10 Mbps) for enhanced connectivity, and a hospitality user (e.g., standard room guest) in the third zone 210-3 would have access to normal bandwidth (5 Mbps) for typical online activities.

As another example, each zone 210 within the hospitality establishment 120 is designated with specific media streaming services according to a predetermined segmentation rule. In the first zone 210-1, limited streaming services are provided. Hospitality users in the first zone may have access to a basic selection of media contents for streaming, for example, restricted to a few popular channels or content providers, on the first LAN segment 220-1. The second zone 210-2 is designated with specific channels (e.g., sports channels or contents) on the second LAN segment 220-2. The second zone 210-2 caters to hospitality users who are interested in the specific contents. Access to these specific channels is limited to MSD 125 associated with the hospitality users and connected to the second LAN segment 220-2. Hospitality users in other zones may not have access to the specific channels designated to the second zone 210-2. The third zone 210-3 may cover standard guest rooms and offer a standard set of streaming services. On the other hand, the fourth zone 210-4 may cover premium guest rooms and provide a broader range of streaming and content services. Premium room guests may enjoy enhanced access compared to standard room guests, aligning with the elevated expectations associated with premium accommodations. When a hospitality user is authenticated by the CUAMS 102 upon connecting to the network, the network manager 152 may identify the hospitality user's location or zone and instructs the service provisioning device 103 in that zone on what streaming and content services to make available to the hospitality user. Access to specific channels, contents, or streaming services may be controlled through network manager 152 to ensure that only hospitality users in the designated zone have access to the specific services according to the predetermined segmentation rule.

Figure 3:
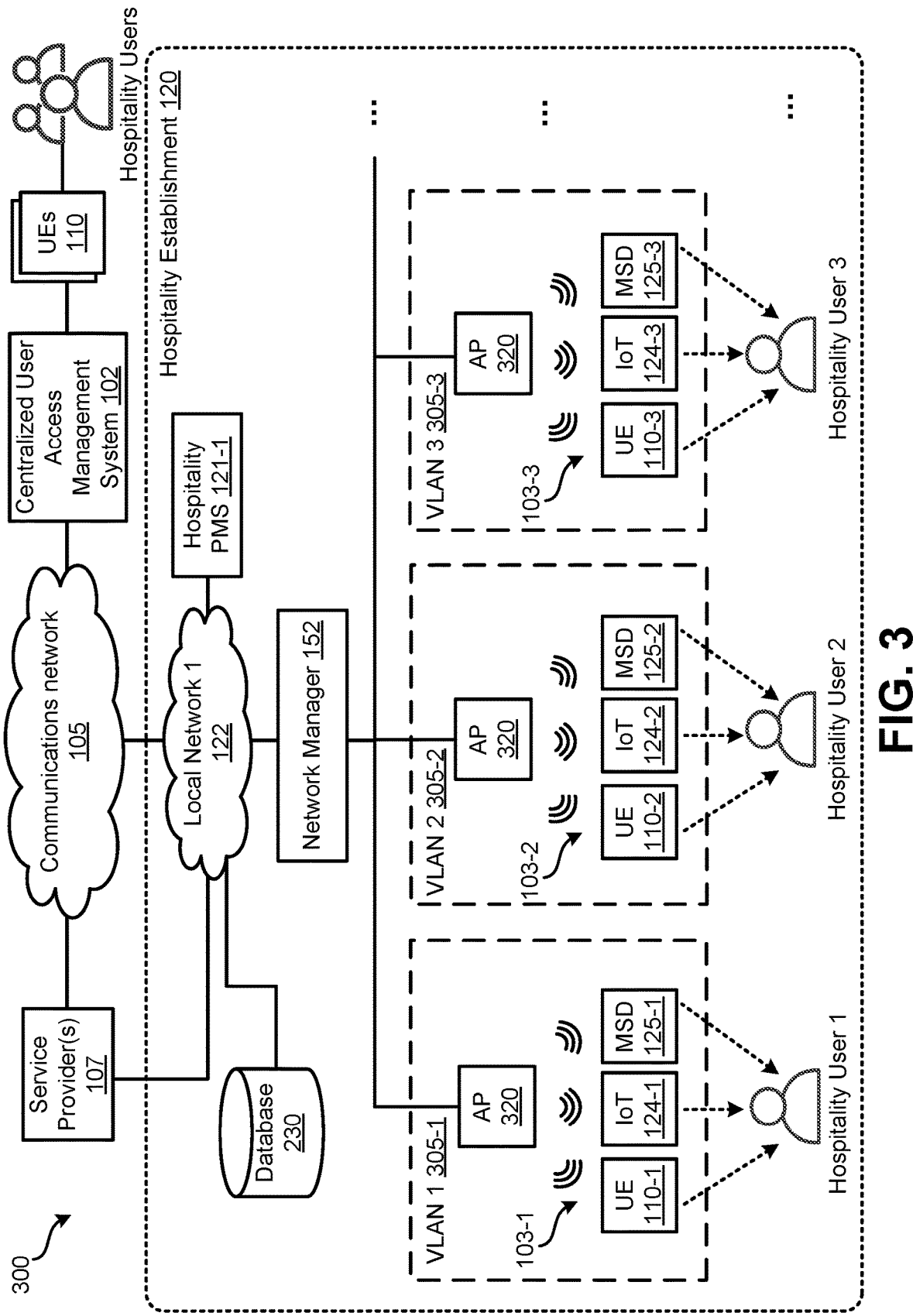
FIG. 3 is a block diagram illustrating another example of a communications system according to various embodiments.

FIG. 3 is a block diagram illustrating another example of a communications system 300 (also referred to as "system 300") according to various embodiments. System 300 is a service provisioning system for providing access to services to multiple hospitality users within a hospitality establishment. In the illustrated example, system 300 includes, among other components, a hospitality establishment 120 (e.g., the first hospitality establishments 120-1 of FIG. 1A), a CUAMS 102, network manager 152, database(s) 230, UE 110, and one or more service provisioning devices 103. The first hospitality establishments 120-1 may be an MDU environment (hereinafter MDU) that contains multiple compartments or separate living units within the hospitality establishment 120.

The network manager 152 may be used to configure the network infrastructure of the hospitality establishment 120 and create multiple VLANs 305 (e.g., a first VLAN 305-1, a second VLAN 305-2, a third VLAN 305-3). The network manager 152 may further assign one or more VLANs to the service provisioning devices 103 associated with each hospitality user (e.g., hospitality user 1, hospitality user 2, hospitality user 3, etc.), such that each hospitality user may use a specific VLAN 305 within the hospitality establishment. The service provisioning devices 103 (e.g., 103-1) associated with or connected to a specific VLAN 305 (e.g., VLAN 305-1) will not be available and accessible to the service provisioning devices 103 (e.g., 103-2) associated with or connected to another VLAN 305 (e.g., VLAN 305-2). Through VLAN isolation, service provisioning devices 103 in one VLAN are shielded from service provisioning devices 103 in other VLANs, reducing the risk of unauthorized access and security breaches. The VLAN isolation can also help protect the privacy of hospitality users. VLANs in the hospitality establishment 120 may also allow network traffic segmentation for management, monitoring, and quality of service (QOS) purposes.

In some embodiments, the APs 320 of the hospitality establishment 120 can be configured to allow the service provisioning devices 103 associated with the hospitality user to connect to the VLAN 305 assigned to the hospitality user via the APs 320. In some embodiments, once a hospitality user is connected to an AP 320 within the hospitality establishment 120, the AP 320 facilitates the connection. The hospitality PMS 121 sends an authentication request to the CUAMS 102, and in response, the CUAMS 102 automatically performs an authentication process and determines an authentication status of the hospitality user. The hospitality PMS 121 determines a user registration status or user reservation status of the hospitality user and determines the services the hospitality is entitled to access. The network manager 152 assigns a VLAN 305 to the hospitality user according to the registration status of the hospitality user. Different VLANs 305 may correspond to different levels of access or services. The hospitality PMS 121 may also retrieve the users profile information, which could include user preferences, specific service requirements, and others. Based on the user profile and the assigned VLAN 305, the hospitality PMS 121 determines which services should be provisioned to the hospitality user.

As mentioned above, the hospitality PMS 121 may identify the service provisioning devices 103 associated with the hospitality user and the connected to the assigned VLAN 305. In some embodiments, the hospitality PMS 121 may send instructions to the service provisioning devices 103. These instructions specify how to provision the determined services via the assigned VLAN 305. The service provisioning devices 103 is caused to provision the determined services to the hospitality user.

In some embodiments, when a service provisioning device 103 (e.g., UE 110) connected to a VLAN 305 assigned to a hospitality user initiates a service provisioning session (e.g., media streaming), and the hospitality user moves within the hospitality establishment 120, the service provisioning device 103 can remain connected to the VLAN 305 without disconnection or interruption of the service provisioning session.

In some embodiments, the network manager 152 can facilitate the configuration of a VLAN 305 to span across all APs 320 within a hospitality establishment 120 to create an extended VLAN 305 for a hospitality user. For example, the network manager 152 may assign a consistent VLAN ID to the VLAN 305 associated with the hospitality user with uniformity across all networking infrastructure of the hospitality establishment 120. Network switches to which the APs 320 are connected are configured to include the extended VLAN in their VLAN database, and trunk ports interconnecting these network switches and the APs 320 are set up to carry traffic for multiple VLANs 305 (including the extended VLAN). Each AP 320 is configured to support multiple VLANs 305 to enable them to handle traffic for the extended VLAN. Additionally, DHCP (Dynamic Host Configuration Protocol) is configured to allocate IP addresses to UE 110 within the VLAN 305, and IP address persistence technologies such as Mobile IP, Mobile IPV6, or Dynamic DNS Updates are implemented to allow the UE 110 to maintain their assigned IP addresses consistently as they move between APs 320 within the hospitality establishment 120. Accordingly, UE 110 can experience uninterrupted network services and IP address continuity regardless of their location within the hospitality establishment 120.

Figure 4:
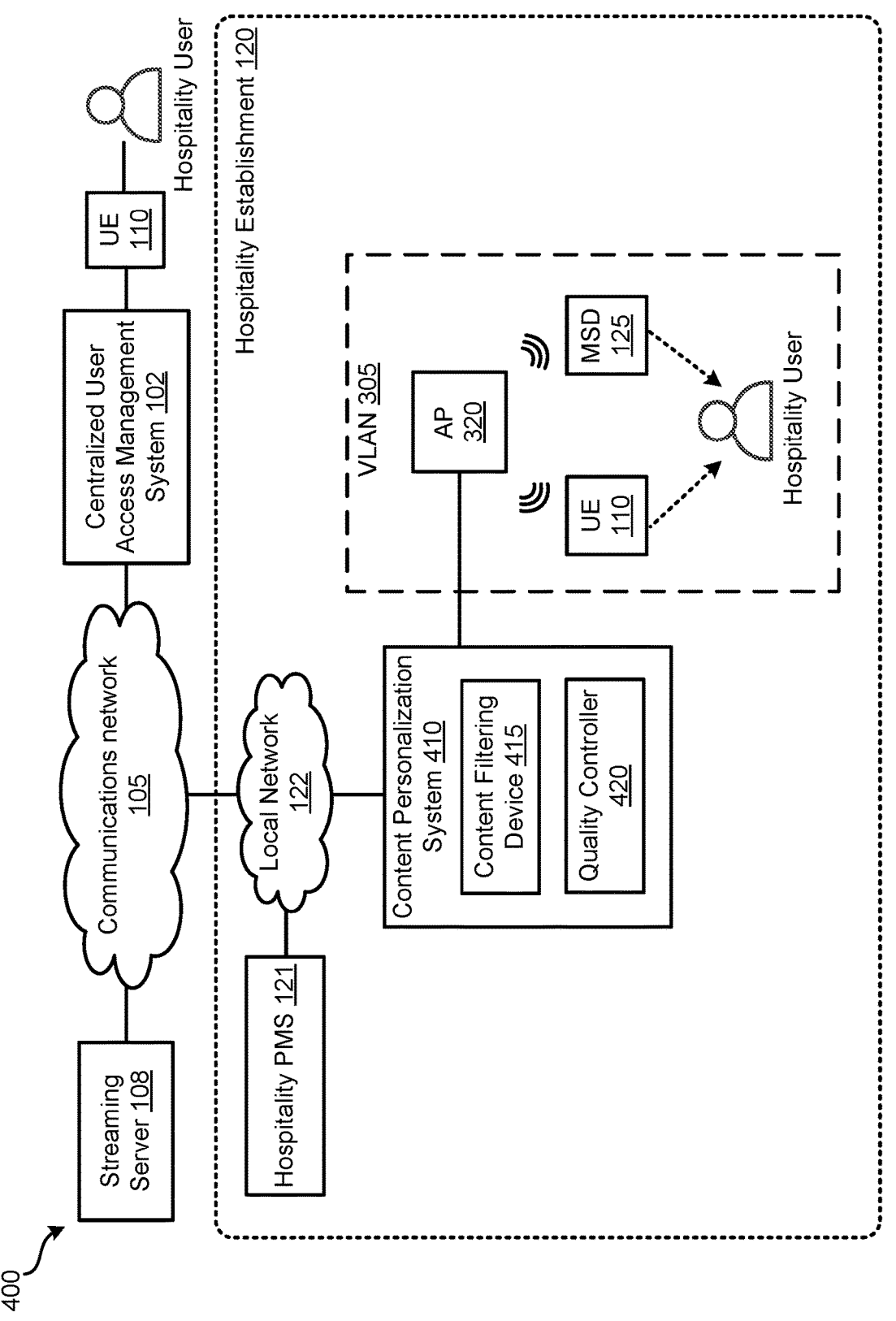
FIG. 4 is a block diagram illustrating another example of a communications system according to various embodiments.

FIG. 4 is a block diagram illustrating another example of a communications system 400 (also referred to as "system 400") according to various embodiments. System 400 can be used to personalize media streaming and content delivery services to a hospitality user within a hospitality establishment. In the illustrated example, system 400 includes, among other components, a CUAMS 102, a wireless network 105, a streaming server 108, a hospitality PMS 121, a content personalization system 410, and service provisioning devices 103 such as UE 110 and MSD 125. Various components included in system 400 may be in communication with each other through the wireless network 105.

The streaming server 108 as described above may be a third-party content provider responsible for providing medial content and streaming and delivery services to the hospitality establishment 120 through the wireless network 105. The content personalization system 410 is responsible for customizing media content to cater to the user preferences data included in the user profile of each individual hospitality user. The content personalization system 410 can either be integrated into the network manager 152 (as shown in FIG. 3) or operate as an independent server system within the hospitality establishment 120. In some embodiments, the content personalization system 410 further includes a content filtering component 415 and a quality controller 420.

The content filtering component 415 is configured to receive content, directly or indirectly, from the streaming server 108, receive an instruction generated by and sent from the hospitality PMS 121, filter the content according to the instruction, and deliver the filtered content to the service provisioning devices 103 associated with the hospitality user via the personalized VLAN 305 assigned to the hospitality user. As an example, the content filtering component 415 may be a channel filtering device. The content filtering component 415 may include, among other components, a network interface, a processor, a content filtering application, and a storage. The network interface is configured to receive data packets defining the content from the communications network and transfer the data packets to the processor. The network interface is configured to receive an instruction from the hospitality PMS 121. As mentioned above, the instruction may indicate the designated content streaming service and content resource to be provisioned to a particular hospitality user according to the corresponding user profile and the user registration status of the hospitality user. The user registration status of the user may be provided by the hospitality PMS 121 and indicate the permissible contents (e.g., TV channels, movies, shows, events, audios, sport games, etc.) for the hospitality user based on the user experience level (e.g., membership, loyalty, etc.) indicated by the user registration status. The user profile may include a recommendation list of contents based on user viewing preferences.

The content filtering application may be stored in a memory device. A set of pre-established filtering rules are stored in the storage. The filtering rules may be established based on the user profiles and further define the content or channel to be allowed or blocked with respect to each VLAN 305 assigned to the hospitality user. For example, a user profile may include a channel list having allowed channels for the hospitality user. The filtering rules may define the allowed channels for the VLAN 305 and the channels excluded from the channel list or to be blocked. The filtering rules may further define the filtering mechanism. For example, the filtering mechanism may be based on the network ID (e.g., SSID), VLAN ID, or IP addresses assigned to the UE 110 and MSD 125 associated with the hospitality.

The quality controller 420 may include specialized network interface cards (NICs), a QoS engine, and other network devices or functions that are optimized for high-speed data packet processing and can apply pre-established QoS rules in real-time. Similar to the filtering rule, the QoS application may define the level of quality for content streaming service to be delivered to the service provisioning devices 103 associated with the hospitality user and connected to the VLAN 305 assigned to the hospitality user, according to the designated content streaming service to the hospitality user. The QoS application is configured to control network traffic and apply QOS rules, based on the user segment to which the traffic belongs. For example, the QoS application is executable to cause the quality controller 420 to deliver the content to a service provisioning device 103 associated with a hospitality user and connected to the VLAN 305 assigned to the hospitality user at a predetermined bitrate level specified in the instruction.

FIG. 5A is a flow diagram illustrating an example method 500A for provisioning access to services to a hospitality user in a hospitality establishment of a hospitality chain, according to various embodiments. The method 500A may be performed by one or more components of the system or device illustrated by FIGS. 1A-1B and 2-4, such as one or more components of the system 100A, 100B, 200, 300, and

400. Depending on the implementation, the method 500A may include additional, fewer, or alternative steps performed in various orders or in parallel. Method 500A or any operations thereof may be combined with other methods (e.g., method 500B or 600) or operations thereof described herein in a suitable manner.

At 502, a wireless network access profile for a hospitality user of a hospitality chain is created, for example, by a cloud-based CUAMS. The hospitality chain has multiple hospitality establishments, and each hospitality establishment has a wireless network (e.g., a LAN). The wireless network access profile may be a part of a hospitality user profile (or user profile) created by the CUAMS. The wireless network access profile may include a user ID, user credential, and other user information pertaining to the hospitality user. The user credential may be a PSK previously generated by and registered with a registration system in connection with the CUAMS. The wireless network access profile further includes a network ID of the wireless network of each hospitality establishment. The network ID may be an SSID of the wireless network.

In some embodiments, the user credential includes a common PSK that can be used for authentication to obtain access to wireless network of all hospitality establishments of the hospitality chain. In some embodiments, the multiple hospitality establishments include a first hospitality establishment and a second hospitality establishment. The first hospitality establishment has a first network ID, and the second hospitality establishment has a second network ID. Both the first network ID and the second network ID are stored in the wireless network access profile.

At 504, a request for authentication is received in an AP connected to a wireless network of the first hospitality establishment. The authentication request may be sent from a wireless device associated with and operated by the hospitality user. The wireless device may be a UE of the hospitality user (e.g., a mobile device) or a service provisioning device of the hospitality establishment. The authentication request may further include the user ID and a user-provided credential. The user-provided credential may be the PSK that is stored in the wireless device.

At 506, a cloud-based authentication is performed by the CUAMS. In some embodiments, a WPA-3 based authentication protocol may be used. In other embodiments, a WPA-2, WPA, or other suitable authentication protocols may be employed. In some embodiments, operation 506 further includes operations 508 and 510. At 508, the wireless network access profile is located, by the CUAMS, according to the user ID included in the authentication request provided by the wireless device. At 510, the presence or absence of a match of the user credential included in the wireless access profile and the user-provided credential included in the authentication request is identified and determined.

At 512, an authentication status is sent, by the CUAMS, to the AP. In some embodiments, the authentication status is sent to a hospitality PMS of the hospitality establishment, and then forwarded to the AP. The authentication status may be active or inactive, the active authentication status indicates that the hospitality user is authenticated to obtain access to the wireless network. The inactive authentication status on the other hand indicates that the hospitality user is not authenticated.

At 514, a user registration status of the hospitality user is received in the AP. The user registration status of the hospitality user may be determined by the hospitality PMS.

At 516, access to wireless network is provided to the wireless device, based on the authentication status and the user registration status of the hospitality user.

FIG. 5B is a flow diagram illustrating an example method 500B for provisioning access to services to a hospitality user in a hospitality establishment of a hospitality chain, according to various embodiments. The method 500B may be performed by one or more components of the system or device illustrated by FIGS. 1A-1B and 2-4, such as one or more components of the system 100A, 100B, 200, 300, and 400. Depending on the implementation, the method 500A may include additional, fewer, or alternative steps performed in various orders or in parallel. Method 500B or any operations thereof may be combined with other methods (e.g., method 500A or 600) or operations thereof described herein in a suitable manner.

At 552, a hospitality user access management profile (also referred to as "user profile") for a hospitality user of a hospitality chain is created by a cloud-based CUAMS. The hospitality chain has multiple hospitality establishments, and each hospitality establishment has at least one wireless network. In some embodiments, the user profile includes a wireless network access profile and a user preference profile. The wireless network access profile is described above and will not be repeated unless otherwise indicated. The user preference profile includes service type data and user preference data pertaining to a service to be provisioned by each one of the hospitality establishments. For example, the service may include a room temperature setting for a guest room, and the user preference data may indicate a room temperature preferred by the hospitality user. For another example, the service may include a media streaming service, and the user preference data may correspondingly indicate a preferred media streaming service or a preferred media content item by the hospitality user, such as a TV channel, a live sport game, a movie genre, among others. In some embodiments, the user preference profile may include a list of recommended services (e.g., a list of recommended streaming services or a list of recommended media content items). The list of recommended services may be generated by a user analytics server. Historical user behavior and user analytics data may be collected by the user analytics server and further processed to extract one or more user characteristics and predict the user preferences on a service to be provisioned by each one of the multiple hospitality establishments.

At 554, a notification is received in the CUAMS. The notification indicates that the hospitality user boards on a first hospitality establishment of the multiple establishments. The notification may be generated by a hospitality PMS of the first hospitality establishment, during the onboarding or registration process. In some embodiments, the notification further indicates a user registration status as described above.

At 556, a determination is made, by the CUAMS, that the hospitality user is authenticated to access service to be provisioned by the first hospitality establishment. An authentication process may be performed by the CUAMS, according to any method described herein, for example, operations included in method 500A.

At 558, the user preference profile is sent from the CUAMS to a service provisioning manager of the first hospitality establishment. The service type data and the user preference data included in the user preference profile are received in the service provisioning manager.

At 560, a service provisioning device associated with the hospitality user and connected to the wireless network of the first hospitality establishment is identified by the service provisioning manager. The service provisioning device may be a UE (e.g., mobile device operated by the hospitality user and brought to the first hospitality establishment), or a IoT device provided by the first hospitality establishment, or a media streaming device provided by the first hospitality establishment. For example, a zone (e.g., a guest room, a common area, a conference room, etc.) where the hospitality user is located may be identified based on the user registration status. The service provisioning device located connected to the wireless network via the APs in the zone are identified. In some embodiments, a VLAN is assigned to the hospitality user, and the service provisioning device connected to the VLAN assigned to the hospitality user are identified.

At 562, the identified service provisioning device is caused to provision a service to the hospitality user, according to the service type data and the user preference data. In some embodiments, an instruction is transmitted from the network provisioning manager to the service provisioning device, and the instruction indicates a target service parameter for a service. The service setting is configured by the service provisioning device according to the target service parameter, according to the user preference data. In some embodiments, the service setting is a room environment setting such as lighting condition or lightness, room temperature, bath water temperature, humidity, etc. In some embodiments, the target service parameter is the value preferred by the hospitality user indicated in the user preference data.

In some embodiments, the service is automatically provisioned. In some embodiments, the service is provisioned in response to a user request for access to the service. In some embodiments, one or more options of the service are provided to the hospitality user for the hospitality user to select. For example, one or more media streaming services such as TV channels, movies, media content items according to the list of recommended media streaming services or the recommended media content items included in the user preference data of the user profile may be provided to the hospitality user by the media streaming device.

FIG. 6 is a flow diagram illustrating an example method 600 for provisioning access to services to a hospitality user in a hospitality establishment of a hospitality chain, according to various embodiments. The method 600 may be performed by one or more components of the system or device illustrated by FIGS. 1A-1B and 3-4, such as one or more components of the system 100A, 100B, 300, and 400. Depending on the implementation, the method 600 may include additional, fewer, or alternative steps performed in various orders or in parallel. Method 600 or any operations thereof may be combined with other methods (e.g., method 500A or 500B) or operations thereof described herein in a suitable manner.

At 602, multiple VLANs of a wireless network of a hospitality establishment is created, by a network manager of the hospitality establishment. The hospitality establishment includes multiple zones including a first zone and a second zone.

At 604, the multiple VLANs are configured by the network manager to isolate network traffic of each VLAN from one another. In some embodiments, a Layer 2 network segmentation is performed to separate the VLANs using a VLAN tagging mechanism (e.g., IEEE 802.1Q mechanism). VLAN segmentation enhances network security by limiting the scope of communication. Service provisioning devices connected to the VLAN are protected from exposure to other service provisioning devices not connected to the VLAN. In addition, Additionally, VLAN segmentation safeguards data transmitted within the network traffic of each VLAN from interference originating from other VLANs, thereby providing an enhanced level of security.

At 606, a determination is made, by a hospitality PMS of the hospitality establishment, a hospitality user boards on the hospitality establishment. In some embodiments, a user registration status of the hospitality user is determined by the hospitality PMS, and the determination is made based on the user registration status.

At 608, the hospitality user is authenticated, by a cloud-based CUAMS. In some embodiments, a request for authentication is sent from a wireless device associated with the hospitality user and connected to the wireless network of the hospitality establishment. An authentication process is performed in response to the authentication request. In some embodiments, the authentication process may be performed according to the method 500A described above.

At 610, a first VLAN is assigned, by the network manager, to the hospitality user. In some embodiments, a VLAN ID is generated for the VLAN and associated with the user ID of the hospitality user.

At 612, a service provisioning device associated with the hospitality user is identified, by the network manager. The service provisioning device is in the first zone of the hospitality establishment and connected to the first VLAN via a first AP in the first zone.

At 614, a service provisioning session between a service provider and the service provisioning device is initiated using the first VLAN, by the service provisioning manager to provision the service to the hospitality user through the first VLAN. The service provisioning session serves as the conduit through which the service is delivered to the hospitality user, effectively utilizing the resources and parameters associated with the first VLAN.

At 616, continuity of the service provisioning session is maintained when the service provisioning device roams within the hospitality establishment (e.g., moving from the first zone into the second zone and is connected to a second AP in the second zone).

Figure 7:
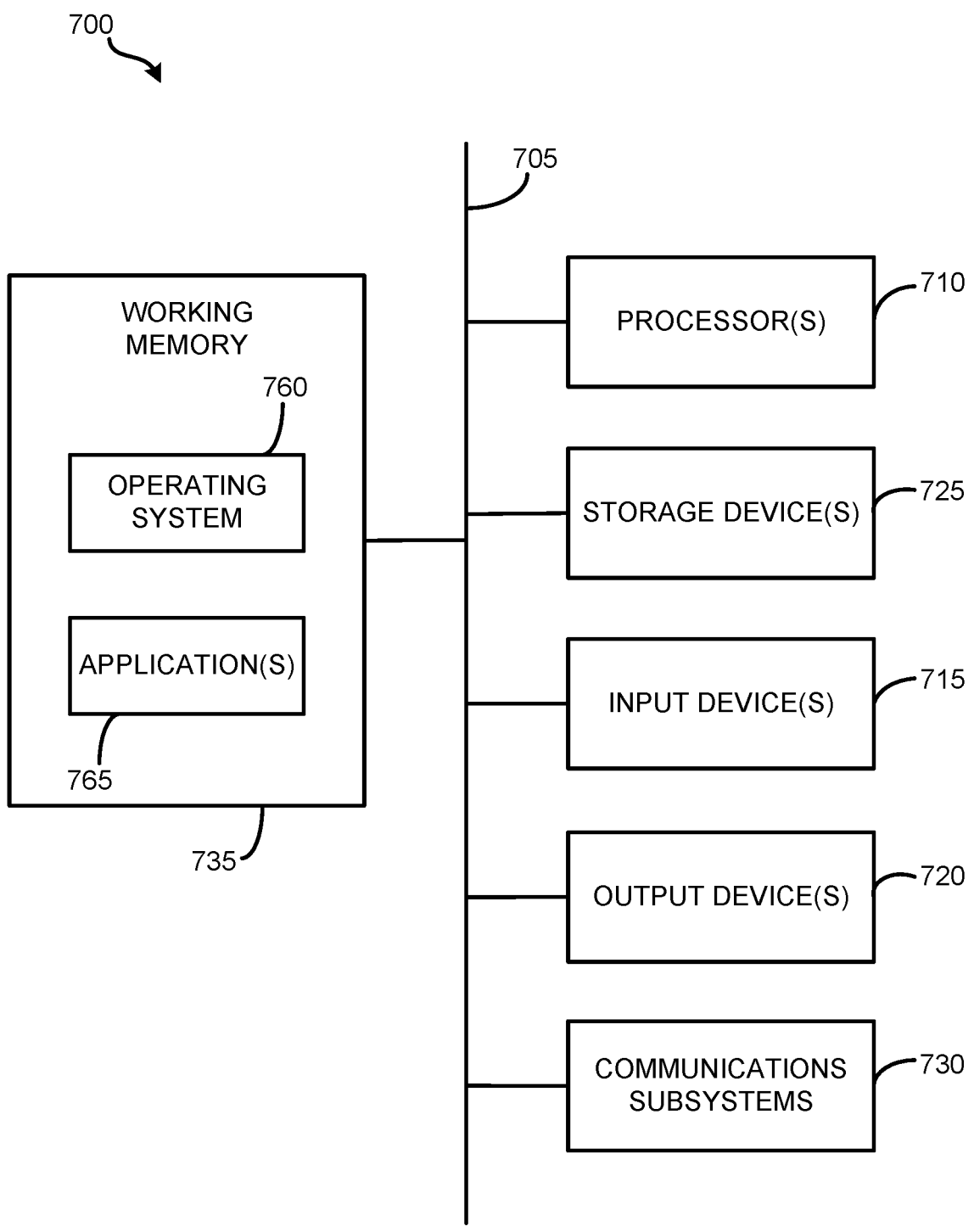
FIG. 7 is a block diagram illustrating an embodiment of a computer system according to various embodiments.

The communications systems 100A, 100B, 200, 300, 400, and any components included therein as described above may include a computer system that further includes computer hardware and software that form special-purpose network circuitry to implement various embodiments such as communication, model construction, optimization, calculation, determination, and so on. FIG. 7 is a schematic diagram illustrating an example of computer system 700. The computer system 700 is a simplified computer system that can be used to implement various embodiments described and illustrated herein. A computer system 700 as illustrated in FIG. 7 may be incorporated into devices such as a portable electronic device, mobile phone, server grade machines, or other device as described herein. FIG. 7 provides a schematic illustration of one embodiment of a computer system 700 that can perform some or all of the steps of the methods and workflows provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown including hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include without limitation a mouse, a keyboard, a camera, and/or the like; and one or more output devices 720, which can include without limitation a display device, a printer, and/or the like.

The computer system 700 may further include and/or be in communication with one or more non-transitory storage devices 725, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 730 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 730. In other embodiments, a portable electronic device, e.g., the first electronic device, may be incorporated into the computer system 700, e.g., an electronic device as an input device 715. In some embodiments, the computer system 700 will further include a working memory 735, which can include a RAM or ROM device, as described above.

The computer system 700 also can include software elements, shown as being currently located within the working memory 735, including an operating system 760, device drivers, executable libraries, and/or other code, such as one or more application programs 765, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 7, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the operations of such methods are performed by the computer system 700 in response to processor 710 executing one or more sequences of one or more instructions, which might be incorporated into the operating system 760 and/or other code, such as an application program 765, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, solid state drive, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a device" includes a plurality of such devices, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

What is claimed is:

1. A method comprising:
creating, by a cloud-based centralized user access management system (CUAMS), a user profile for a hospitality user of a hospitality chain, wherein the hospitality chain comprises a plurality of hospitality establishments, the user profile includes a wireless network access profile and a user preference profile, the wireless network access profile includes a user ID and user credential, and the user preference profile includes service type data and user preference data pertaining to a service to be provisioned by each one of the plurality of hospitality establishments;
receiving a request for authentication in an access point (AP) connected to a wireless network of a hospitality establishment of the plurality of hospitality establishments, wherein the request is sent from a wireless device associated with the hospitality user and connected to the AP, and the request includes the user ID and a user-provided credential;
performing, by the CUAMS, a cloud-based authentication process to determine an authentication status of the hospitality user;
sending the authentication status of the hospitality user to a hospitality property management system (PMS) of the hospitality establishment;
determining, by the hospitality PMS, a user registration status of the hospitality user; and
in response to an active authentication status, providing access to the wireless network to the wireless device, based on the user registration status of the hospitality user.

2. The method of claim 1, wherein the performing the cloud-based authentication process further comprises:
locating the wireless network access profile of the hospitality user; and
identifying presence or absence of a match of the user credential included in the wireless network access profile and the user-provided credential included in the authentication request,
wherein the presence of a match indicates an active authentication status.

3. The method of claim 2, wherein the user credential is a predetermined pre-shared key (PSK) generated by a user registration system, and the user-provided credential is a user-provided PSK stored in the wireless device.

4. The method of claim 1, wherein the user registration status indicates bandwidth restrictions, designated access time periods, service duration, Quality of Service (QOS) settings for which access to the wireless network is permitted.

5. The method of claim 1, further comprising:
identifying, by a service provisioning manager, a service provisioning device associated with the hospitality user, based on the user registration status; and causing, by the service provisioning manager, the identified service provisioning device to provision a service to the hospitality user according to the user preference data.

6. The method of claim 5, further comprising:
locating the user preference profile of the hospitality user;
transmitting the service type data and user preference data to the service provisioning manager;
sending an instruction, by the service provisioning manager to the identified service provisioning device, the instruction indicating a target service parameter; and
configuring a service setting, by the identified service provisioning device, based on the target service parameter.

7. The method of claim 6, wherein:
the service setting is a room environment setting comprising a lightness setting, a room temperature setting, a humidity setting, and a bath water temperature setting; and
the target service parameter indicates a target lightness, a target room temperature, a target humidity, and a target bath water temperature, based on the user preference data.

8. The method of claim 5, wherein the identified service provisioning device is a media streaming device, the provisioning the service further comprises providing the hospitality user with a list of recommended media content items for the hospitality user to choose, and the list of recommended media is generated based on the user preference data.

9. The method of claim 1, further comprising:
creating, by a network manager of the hospitality establishment, a plurality of virtual local area networks (VLANs) of the wireless network;
assigning, by a network manager of the hospitality establishment, a virtual local area network (VLAN) of the plurality of VLANs to the hospitality user;
configuring, by the network manager, the plurality of VLANs to isolate network traffic of the VLAN assigned to the hospitality user from other VLANs; and
initiating, by a service provisioning manager, a media streaming session between a media stream provider and a service provisioning device within the VLAN.

10. The method of claim 9, further comprising:
maintaining continuity of the media streaming session within the VLAN while the service provisioning device is roaming in the hospitality establishment.

11. A system for provisioning a service to a hospitality user of a hospitality chain, the hospitality chain including a plurality of hospitality establishments, wherein the system comprises:
a cloud-based centralized user access management system (CUAMS);
a hospitality property management system (PMS) of each one of the plurality of hospitality establishments, each hospitality PMS including a service provisioning manager and a network manager; and
one or more service provisioning devices in connection with the hospitality PMS;
wherein the CUAMS is configured to:
create, in the CUAMS, a user profile for the hospitality user, wherein the user profile includes a wireless network access profile and a user preference profile, the wireless network access profile includes a user ID and user credential, and the user preference profile includes service type data and user preference data pertaining to a service to be provisioned by each one of the plurality of hospitality establishments;
receive, in the CUAMS, a request for authentication from a wireless device associated with the hospitality user and connected to an access point (AP) of a wireless network of a hospitality establishment of the plurality of hospitality establishments, the request including the user ID and a user-provided credential;
perform, by the CUAMS, a cloud-based authentication process to determine an authentication status of the hospitality user; and
send the authentication status of the hospitality user to the hospitality PMS; and
wherein the hospitality PMS is configured to:
determine a user registration status of the hospitality user; and
in response to an active authentication status, provide access to the wireless network to the wireless device by the network manager, based on the user registration status of the hospitality user.

12. The system of claim 11, wherein the CUAMS is further configured to:
locate the wireless network access profile of the hospitality user; and
identify presence or absence of a match of the user credential included in the wireless network access profile and the user-provided credential included in the authentication request,
wherein the presence of a match indicates an active authentication status.

13. The system of claim 12, wherein the user credential is a predetermined pre-shared key (PSK) generated by a user registration system, and the user-provided credential is a user-provided PSK stored in the wireless device.

14. The system of claim 11, wherein the user registration status indicates bandwidth restrictions, designated access time periods, service duration, Quality of Service (QOS) settings for which access to the wireless network is permitted.

15. The system of claim 11, wherein the hospitality PMS is further configured to:
identify, from the one or more service provisioning devices, a service provisioning device associated with the hospitality user, based on the user registration status; and
cause the identified service provisioning device to provision a service to the hospitality user according to the user preference data.

16. The system of claim 15, wherein the CUAMS is further configured to:
locate the user preference profile of the hospitality user; and
transmit the service type data and user preference data to the service provisioning manager;
wherein the hospitality PMS is further configured to:
send an instruction to the identified service provisioning device, the instruction indicating a target service parameter; and
cause the identified service provisioning device to configure a service setting based on the target service parameter.

17. The system of claim 16, wherein:
the service setting is a room environment setting comprising a lightness setting, a room temperature setting, a humidity setting, and a bath water temperature setting; and the target service parameter indicates a target lightness, a target room temperature, a target humidity, and a target bath water temperature, based on the user preference data.

18. The system of claim 15, wherein the identified service provisioning device is a media streaming device, and the identified service provisioning device is further configured to provide the hospitality user with a list of recommended media content items for the hospitality user to choose, and the list of recommended media is generated based on the user preference data.

19. The system of claim 11, wherein the network manager of the hospitality PMS is configured to:

create a plurality of virtual local area networks (VLANs) of the wireless network;

assign a virtual local area network (VLAN) of the plurality of VLANs to the hospitality user; and configure the plurality of VLANs to isolate network traffic of the VLAN assigned to the hospitality user from other VLANs;

wherein the service provisioning manager of the hospitality PMS is configured to:

initiate a media streaming session between a media stream provider and a service provisioning device within the VLAN; and maintain continuity of the media streaming session within the VLAN while the service provisioning device is roaming in the hospitality establishment.

20. The system of claim 11, wherein the hospitality establishment is selected from a hotel, a resort, a restaurant, an apartment building, a short-term rental property, a student housing, a commercial establishment, a retail establishment, and a manufacturing establishment.

* * * * *